UNITED STATES PATENT OFFICE.

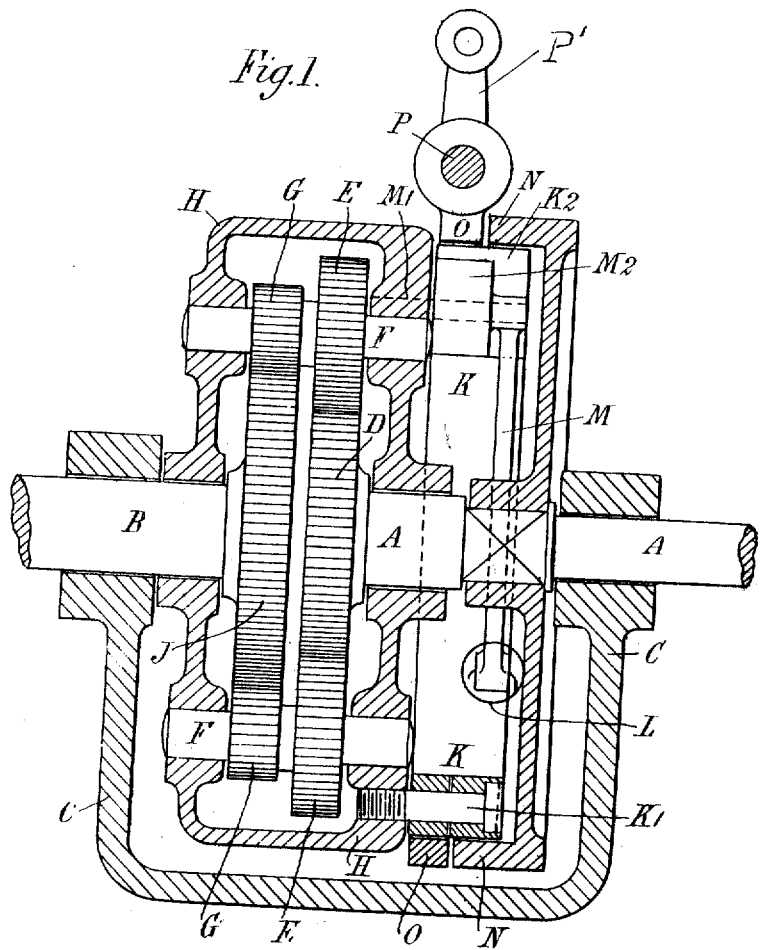

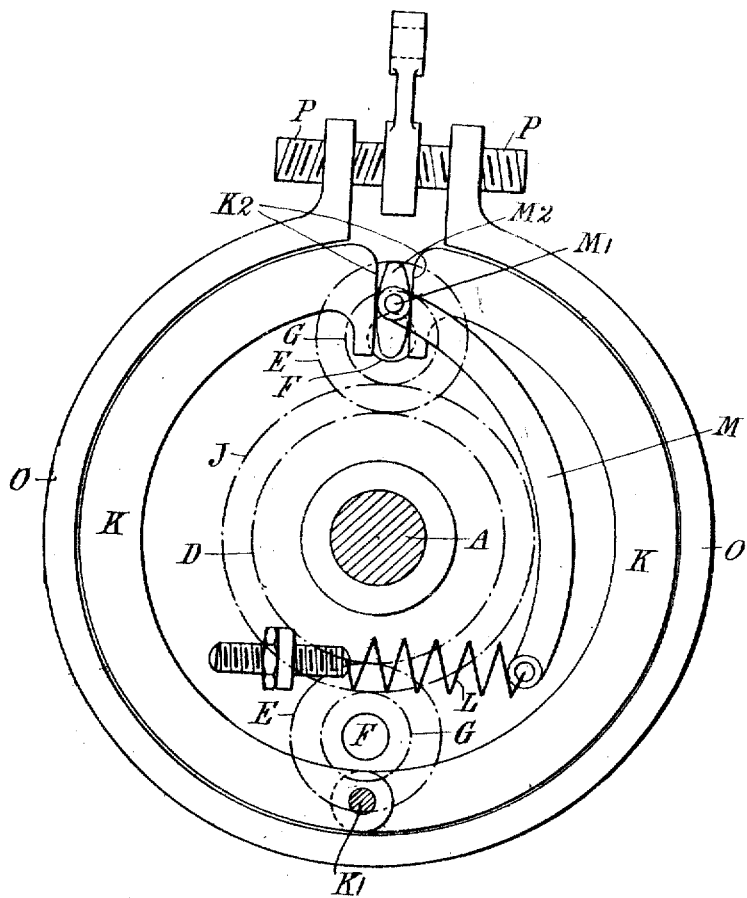

ADRIAN DENMAN-JONES, OF HOLLOWAY, LONDON, ENGLAND, ASSIGNOR TO THE JANDUS ARC LAMP & ELECTRIC COMPANY, LIMITED, OF HOLLOWAY, ENGLAND.

DIFFERENTIAL GEARING.

1,274,056.        Specification of Letters Patent.        Patented July 30, 1918.

Application filed August 20, 1917.  Serial No. 187,221.

*To all whom it may concern:*

Be it known that I, ADRIAN DENMAN-JONES, a subject of the King of Great Britain, residing at 39 Hartham road, Holloway, in the county of London, England, have invented a new and useful Improvement in Differential Gearing, of which the following is a specification.

This invention relates to improved differential gearing especially applicable to motor cars.

According to this invention a driving shaft drives a driven shaft through planet pinions carried by a planet cage which can be secured to either shaft, but preferably to the driving shaft, by a clutch.

Upon the end of the driving shaft is a toothed wheel which gears with a pinion secured to a co-axial pinion, both pinions being mounted upon a shaft carried in bearings on a planet cage free to turn upon the same axis as the driving shaft. The second pinion gears with a toothed wheel upon the driven shaft. Secured to the cage on the same side as the driving shaft is a brake fitted to the cage and constantly pressed outward by a spring to make contact with the inner flange of a brake drum on the driving shaft. A contracting brake, as, for instance, a band brake, secured to the frame of the apparatus is arranged to engage with the outer periphery of the brake. On the contracting brake being actuated the brake is compressed against the action of the spring freeing the brake from the brake drum on the driving shaft and preventing the cage from rotating. When the contracting brake is not in action the driving shaft is directly coupled with the driven shaft, but when the contracting brake is in action the pinions on the cage come into operation and the speed of the driven shaft is altered according to the ratio of the diameter of the pinions.

My invention is illustrated by the accompanying drawings, which show two apparatus made in accordance with this invention.

Figure 1 is a longitudinal section and Fig. 2 is a section on the line 2—2, Fig. 1.

A is a driving shaft and B a driven shaft mounted in bearings on a casing C secured to the frame of a motor car. On the end of the driving shaft A is a toothed wheel D which gears with two pinions E, E, secured to shafts F, F, to which also are secured co-axial pinions G, G. The shafts F, F, are carried in bearings in a planet cage H mounted upon the shafts A and B. The pinions G, G, gear with a toothed wheel J upon the driven shaft B. A brake K is attached to the cage H by a screw pin $K^1$, and a spring L is attached to one end of an arm M, whose other end is pivoted at $M^1$ and has secured to it a cam $M^2$ which engages with the ends $K^2$ of the brake K, constantly pressing the brake K outward into contact with the inner flange of a brake drum N on the driving shaft A. Around the brake K is another brake O actuated by a double screw P carried on the frame of the car. P' is an arm fixed to the screw P by means of which the screw may be turned. When the brake O is not in action the driving shaft is directly coupled with the driven shaft B as the brake K is in contact with the inner flange of the brake drum N, but when the brake O is in action the brake K is freed from the brake drum by turning the arm P' and the cage H is prevented from rotating, consequently the pinions E, E, and G, G, in the cage H come into operation and the shaft B is driven through them.

What I claim is:—

1. In differential gearing, two main shafts, a planet cage mounted on the main shafts, other shafts carried by the planet cage, planet pinions mounted on the last-mentioned shafts, a toothed wheel on each main shaft in gear with the planet pinions, a brake secured to the planet cage, a brake drum on one of the main shafts, a pivotally mounted cam between the ends of the brake, an arm, one end of the arm being secured to the cam, a spring attached to the other end of the arm, and means for counteracting the pressure of the spring and preventing the brake from engaging with the brake drum.

2. In differential gearing, two main shafts, a planet cage mounted on the main shafts, other shafts carried by the planet cage, planet pinions mounted on the last-mentioned shafts, a toothed wheel on each main shaft in gear with the planet pinions, a brake secured to the planet cage, a brake drum one one of the main shafts, a pivotally mounted cam between the ends of the brake, an arm, one end of the arm being secured to the cam, a spring attached to the other end of the arm, a second brake encircling the brake secured to the planet cage, and means for actuating the second brake.

3. In differential gearing, two main shafts, a planet cage mounted on the main shafts, other shafts carried by the planet cage, planet pinions mounted on the last-mentioned shafts, a toothed wheel on each main shaft in gear with the planet pinions, and a clutch consisting of three members, the first member being secured to the planet cage, the second member being secured to one of the main shafts, a spring causing the first member to engage with the second, and the third member being adapted to release the first member from the second and to engage with the first member.

In testimony that I claim the foregoing as my invention, I have signed my name this 23rd day of July, 1917.

ADRIAN DENMAN JONES.